United States Patent [19]

Miller

[11] E Re. 30,609

[45] Reissued May 12, 1981

[54] RESILIENT CONNECTION BETWEEN INNER AND OUTER POLES ON ELECTROMAGNETIC CLUTCH

[75] Inventor: Donald L. Miller, Horseheads, N.Y.

[73] Assignee: Facet Enterprises, Inc., Tulsa, Okla.

[21] Appl. No.: 855,119

[22] Filed: Nov. 28, 1977

Related U.S. Patent Documents

Reissue of:

[64] Patent No.: 3,978,953
Issued: Sep. 7, 1976
Appl. No.: 589,816
Filed: Jun. 24, 1975

[51] Int. Cl.[3] ..... F16D 27/10

[52] U.S. Cl. ..... 192/84 C; 192/84 A

[58] Field of Search ..... 192/84 R, 84 A, 84 AA, 192/84 AB, 84 B, 84 C; 188/161, 162, 163, 164

[56] References Cited

U.S. PATENT DOCUMENTS

| | | | |
|---|---|---|---|
| 3,092,307 | 6/1963 | Heidorn | 192/84 A |
| 3,381,784 | 5/1968 | Miller et al. | 192/84 C X |
| 3,451,516 | 6/1969 | Watson | 192/84 C |
| 3,773,155 | 11/1973 | Fujita et al. | 192/70.25 |
| 3,854,562 | 12/1974 | Wilczewski | 192/84 C |

FOREIGN PATENT DOCUMENTS

| | | | |
|---|---|---|---|
| 1219079 | 1/1971 | United Kingdom | 192/84 C |

*Primary Examiner*—Allan D. Herrmann
*Attorney, Agent, or Firm*—Remy J. VanOphem

[57] ABSTRACT

An electromagnetic clutch has a driving clutch member and a driven clutch member with an armature on one of the members and an electromagnet having a pair of poles on the other of the members for providing a driving engagement between the members when the electromagnet is energized. The poles are attached to one another by resilient material or by splines to provide relative axial movement between the poles to enable both poles to engage the armature with substantially equal force.

The invention relates to electrically operated friction devices and more particularly to electromagnetic clutches.

3 Claims, 3 Drawing Figures

RESILIENT CONNECTION BETWEEN INNER AND OUTER POLES ON ELECTROMAGNETIC CLUTCH

Matter enclosed in heavy brackets [ ] appears in the original patent but forms no part of this reissue specification; matter printed in italics indicates the additions made by reissue.

BACKGROUND OF THE INVENTION

Electromagnetic clutches as used heretofore have a driving clutch member which includes an armature and a driven clutch member which includes an electromagnet having a pair of poles which engage the armature when the electromagnet is energized so that the driving clutch member operates the driven clutch member. The problem with this arrangement is that it is difficult to make the poles engage the armature with equal force. Careful manufacture and run-in are required and even then poor repeatability can be expected even after run-in. Also, after the clutch is removed or otherwise disturbed, temporary loss of torque may occur until the clutch is again run-in. If metal tears from either pole the force on both poles is reduced during the time the metal remains between the pole and armature. Poor contact between the armature and one or both poles increases the reluctance in the magnetic circuit and further reduces the force exerted by the poles on the armature. Reduction in force exerted by the poles on the armature results in lesser maximum torque transmission from the driving to the driven member.

SUMMARY OF THE INVENTION

The present invention relates to an electromagnetic clutch which transmits high torque and requires little or no run-in and maintains consistently high torque transmission throughout its life. This is accomplished simply by connecting the outer pole to the inner pole to provide relative movement between the poles so that both poles interface with the armature independently of one another. The connection can be by means of resilient material between the poles or by providing a spline therebetween. This arrangement permits the poles to move axially and somewhat radially independently and if one pole is forced out of good contact with the armature the other pole still maintains good contact.

The invention contemplates an electromagnetic clutch having a driving clutch member and a driven clutch member, an armature on one of the members, an electromagnet having a pair of poles on the other of the members for providing a driving engagement between the members when the electromagnet is energized, and means for connecting the poles to provide relative axial movement between the poles to enable both poles to engage the armature with substantially equal force.

DRAWINGS

FIG. 1 of the drawing is a side view partly in section of an electromagnetic clutch constructed according to the invention, FIG. 2 is a detail view showing a second embodiment of the invention.

FIG. 3 is a partial end view from line 3—3 of FIG. 2.

DETAILED DESCRIPTION OF THE INVENTION

Figure 1:
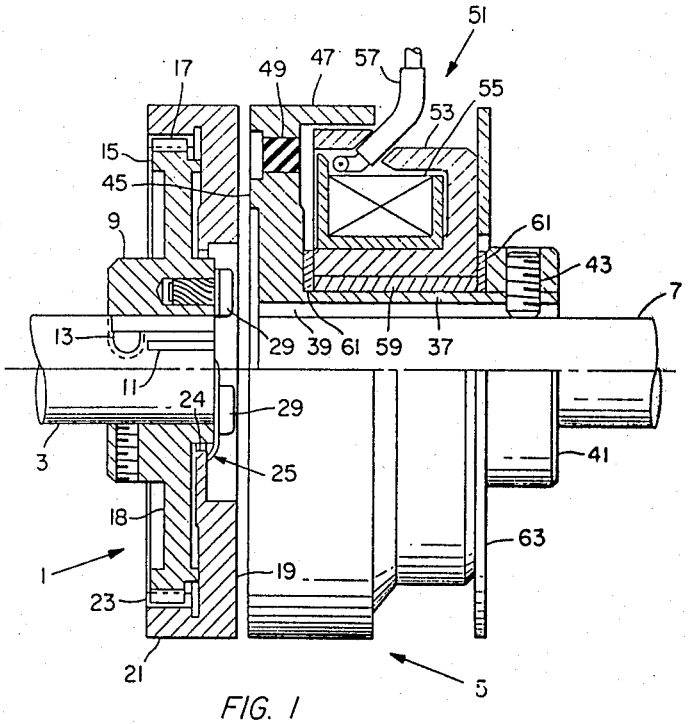

Referring to FIG. 1 of the drawing the novel electromagnetic clutch constructed according to the invention and shown therein comprises an armature assembly 1 keyed to a driving shaft 3 and a magnetic field assembly 5 keyed to a driven shaft 7. Armature assembly 1 includes a hub 9 secured to driving shaft 3 by a key 11 and set screw 13. A rim 15 with a circumferential spline 17 is attached to hub 9 by disk 18. An armature 19 has a circumferential flange 21 with a spline 23 on the inner circumference cooperating with spline 17 on rim 15 for drivably connecting the hub to the armature and for permitting relative axial movement of the armature on the hub. Armature 19 has an axial aperture 24 therein for receiving hub 9. A spring 25 secured to hub 9 by screws 29 moves armature 19 axially on hub 9 for disengaging the clutch.

Magnetic field assembly 5 has a hub 37 secured to driven shaft 7 by a key 39 and a ring 41 with a set screw 43. Hub 37 has an inner pole 45 and an outer pole 47 of magnetic material separated by a ring 49 of nonmagnetic resilient material, such as rubber or an elastomer, to provide relative axial and radial movement of the poles.

An electromagnet 51 has a circular core 53 of magnetic material having a substantially U-shaped cross section and with a coil 55 thereon between the legs of the U. The coil is connected to an electrical lead 57 for energization by a power source. Electromagnet 51 is rotatably mounted on hub 37 by a bearing 59 and thrust washers 61 at each end of the electromagnet. An end plate 63 is secured to core 53. Hub 37 rotates relative to electromagnet 51 when the clutch is engaged to avoid the use of slip rings for providing power to the electromagnet.

When the electromagnet is energized flux passes from the outer leg of core 53 to outer pole 47, to armature 19, to inner pole 45 and to the inner leg of core 53. The resilient connection between outer pole 47 and inner pole 45 permits the poles to move axially and somewhat radially independently of one another. If either pole is forced out of contact with the armature for any reason the other pole still maintains good contact.

Figure 2:
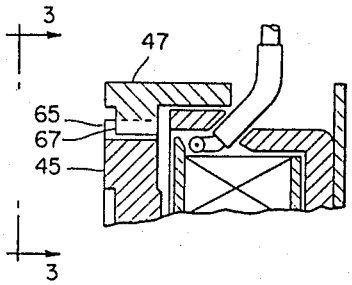
Figure 3:
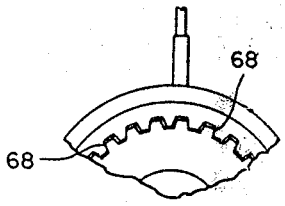

In the embodiment shown in FIG. 2 relative movement of the poles is provided by splines 65 and 67 on poles 45 and 47, respectively, to provide relative axial movement of the poles independently of one another. The poles should be magnetically insulated from one another by coating the splines, as shown in FIG. 3, at 68, with a non-magnetic material or in any other suitable manner.

OPERATION

To engage the clutch electromagnet 51 is energized and the magnetic force moves armature 19 axially on hub 9 along splines 17 and 23 toward inner and outer poles 45 and 47 providing a frictional driving connection between the armature and the poles. To disengage the clutch, electromagnet 51 is deenergized and spring 25 moves armature 19 axially on hub 9 from frictional engagement with poles 45 and 47 to permit relative rotation of armature assembly 1 and magnetic field assembly 5.

With this arrangement splines 65 and 67 or resilient material 49 permit the poles to move axially and somewhat radially independently of one another so that both poles interface and make good contact with the armature. Also, if either pole is forced out of good contact with the armature the other pole still maintains good contact.

The present invention eliminates the need to run-in the clutch and provides high torque output immediately and maintains consistently high torque throughout its life, even if the clutch is removed or otherwise disturbed. Also, if the metal tears from either pole the force on only one pole is reduced during the time the metal remains between the pole and armature and high torque is restored upon removal of the metal.

What is claimed is:

[1. An electromagnet clutch having a driving clutch member and a driven clutch member, an armature on one of the members, an electromagnet having a pair of poles on the other of the members for providing a driving engagement between the members when the electromagnet is energized, and means for connecting the poles to provide relative axial movement between the poles to enable both poles to engage the armature with substantially equal force.]

[2. An electromagnetic clutch as described in claim 1 in which the means for connecting the poles to provide relative axial movement between the poles is resilient material.]

[3. An electromagnetic clutch as described in claim 2 in which the material is rubber.]

[4. An electromagnetic clutch as described in claim 2 in which the resilient material is also non-magnetic.]

[5. An electromagnetic clutch as described in claim 1 in which the means for connecting the poles to provide relative axial movement between the poles are opposing splines.]

[6. An electromagnetic clutch as described in claim 5 having means for insulating the poles magnetically from one another.]

*7. An electromagnetic clutch comprising:*

*a driven clutch member;*

*a driving clutch member mounted adjacent said driven clutch member for cooperation with said driven clutch member;*

*an armature mounted to one of said members;*

*electromagnetic means mounted to the other of said members, said electromagnetic means further comprising an annular inner pole member; an annular outer pole member surrounding said inner pole member for rotation therewith; and magnetically non-permeable resilient means for connecting the inner and outer pole members to provide relative movement between said inner and outer pole members to enable both pole members to engage said armature with substantially equal engaging force.*

*8. An electromagnetic clutch as claimed in claim 7 wherein, said resilient means is rubber.*

*9. An electromagnetic clutch comprising:*

*a driven clutch member;*

*a driving clutch member mounted adjacent said driven clutch member for cooperation with said driven clutch member;*

*an armature mounted to one of said members;*

*electromagnetic means mounted to the other of said members, said electromagnetic means further comprising an annular inner pole member; an annular outer pole member surrounding said inner pole member for rotation therewith; and magnetically non-permeable opposing splines for connecting the inner and outer pole members to provide relative axial movement between said inner and outer pole members to enable both pole members to engage said armature with substantially equal engaging force.*

* * * * *